UNITED STATES PATENT OFFICE.

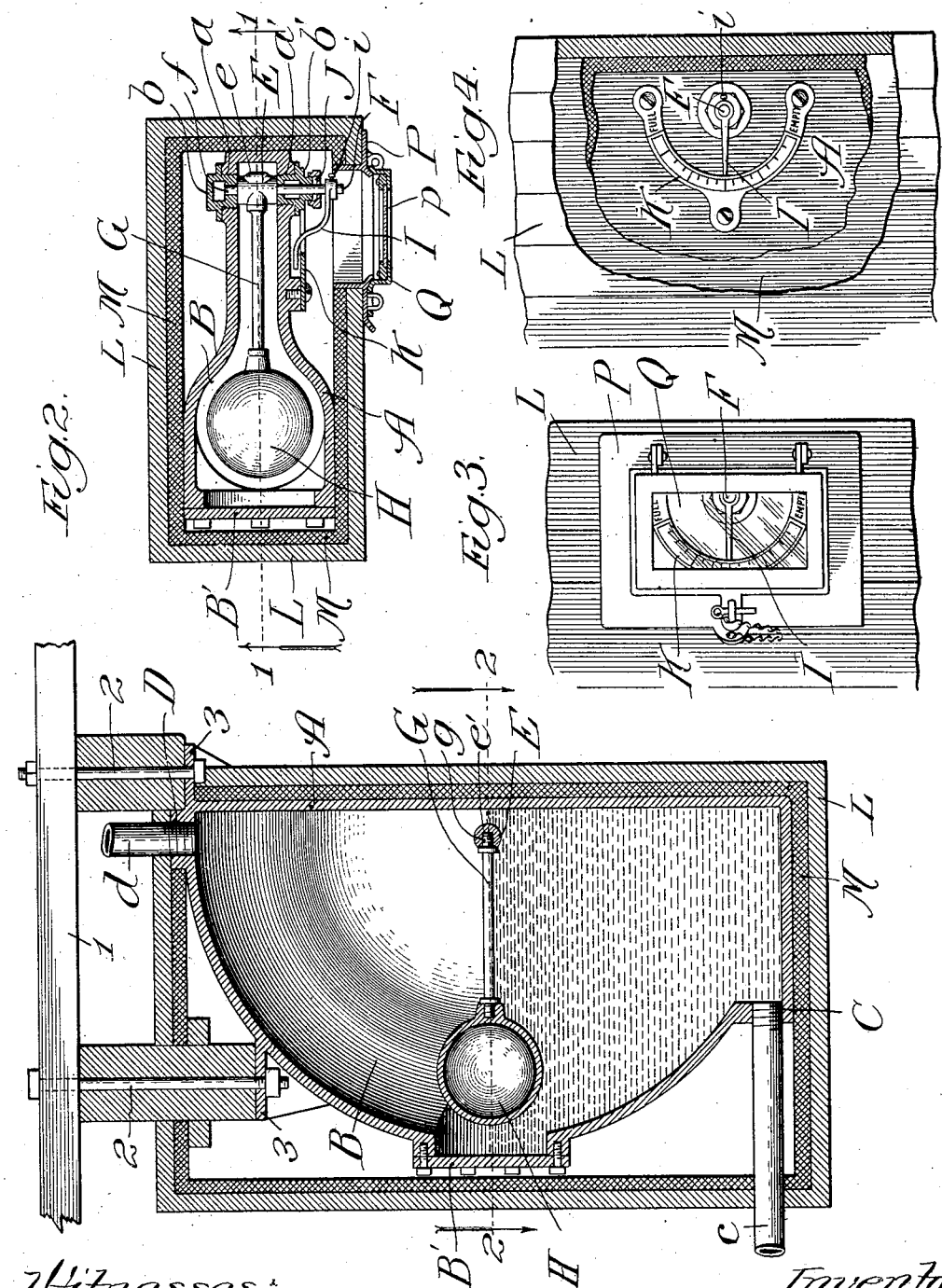

EDWARD A. SCHREIBER, OF CHICAGO, ILLINOIS, ASSIGNOR TO EGBERT H. GOLD, OF CHICAGO, ILLINOIS.

WATER-LEVEL INDICATOR.

No. 860,830.     Specification of Letters Patent.     Patented July 23, 1907.

Application filed April 9, 1906. Serial No. 310,846.

*To all whom it may concern:*

Be it known that I, EDWARD A. SCHREIBER, a citizen of the United States, residing at Chicago, in the county of Cook and State of Illinois, have invented certain new and useful Improvements in Water-Level Indicators, of which the following is a specification.

This invention relates to improvements in water-level indicators, and has special reference to a float-gage adapted to show the level at which a liquid stands in a tank or similar container.

The invention is adapted to be used in a variety of situations, but is particularly adapted and designed for use in connection with a tank such as is carried beneath a Pullman railway car, and which contains the water supply for the lavatories, toilet rooms, etc.

A principal object of the invention is to provide a water-level indicator that is adapted to be used in the situation and for the purpose described.

Another object is the provision of a water-level indicator that is of simple and economical construction and is not likely to get out of order.

In the drawings—Figure 1 is a central, vertical, sectional view of the device in position and inclosed in a non-heat-conducting jacket to prevent freezing in cold weather. Fig. 2 is a plan view of the device in section, the section being taken on the line 2—2 of Fig. 1. Fig. 3 is a broken, elevational, side view, showing the door forming a closure over the graduated scale and pointer of the device, and Fig. 4 is a broken, elevational view of a portion of the device, the non-conducting jacket being broken away to expose to view the graduated scale and pointer.

In the several figures of the drawings like reference characters refer to similar parts throughout.

In the illustrative embodiment of my invention shown in the accompanying drawings, A is a casing having therein a chamber B. This chamber B is designed to be in communication with the tank, (not shown) which contains the water for the lavatories and toilet rooms of a Pullman car. The port C, opening from the chamber B near the bottom of the casing A, is connected, through the pipe c, with the tank near the bottom of the latter, and a port D, near the top of the casing A, may be similarly connected, through the pipe d, with the tank near the top of the latter. With the chamber B and the tank thus connected, it is evident that water will always stand at the same relative level in the chamber B as in the tank, and that any means adapted to indicate the level in the former will, at the same time, indicate the level in the latter.

Rotatably arranged in the chamber B, and having one of its ends extending to the exterior of the casing, is a shaft or spindle E. This shaft or spindle E has a portion e of relatively large diameter which is provided with a screw-threaded aperture e′ adapted to receive the screw-threaded end g of an arm G. This arm G carries upon its free end a float H. As the float is lifted and lowered by the changes in the level of the water in the tank and chamber B, the float and the arm G are caused to swing in an arc about a point passing through the center of rotation of the spindle E.

Mounted upon the extended end F of the spindle E is a pointer I, secured in place upon the spindle by the screw i. This pointer is preferably so adjusted upon the spindle as to be parallel with the arm G. Secured to the side of the casing A is a curved, substantially semi-circular, graduated scale K. This scale is so disposed, relatively to the pointer I, that when the arm G and pointer I are horizontal the latter will be upon the middle point of the scale. The upper end of the scale is marked "Full." The lower end is similarly marked "Empty."

The bearings in which the spindle E is supported and permitted to rotate are adapted to facilitate the insertion and removal of the latter from the casing. The casing is provided with the screw-threaded openings a and a′, one upon each side of the casing. A screw-threaded cap or plug b screws into the opening a and is provided upon its inner side with a bearing for the reduced end f of the spindle. The opening a′ is closed by a cap b′, through which the reduced end F of the spindle passes. Said cap b′ has screw-threads upon its inner end adapted to engage the screw-threads in the opening a′ and has, upon its outer end, screw-threads upon which is adapted to be screwed a compression nut J. Between the cap b′ and the compression nut J may be placed packing material to prevent leakage of water around the spindle. This end F of the spindle is made comparatively small in diameter, so as to reduce the friction which would result from packing a larger spindle sufficiently tight to resist the passage of water therethrough. To give access to the interior of the casing A, the latter is provided with a hand-hole adapted to be closed by the cover-plate B′, which may be secured to the casing A in any convenient manner, as by screws or bolts, as shown.

To prevent freezing, the device is preferably incased in a jacket comprising an outer layer L of wood, and an inner layer M of hair-felt, or similar non-conducting material. An opening is provided through this protective jacket, into which is set a casting P, forming the setting for a hinged door Q, which may, if desired, be provided with a glass pane p through which the scale and pointer may be seen.

I have shown my invention as applied to an auxiliary tank or container, which can be separately constructed and sold as an article which may be readily connected with any principal tank, so as to have the liquid therein standing at the level of the liquid in the principal tank. It is evident, however, that the invention may be applied directly to the principal tank or container, when conditions make this desirable.

In applying my invention to a Pullman car, for which use it is particularly intended, the auxiliary tank A is connected with the car sill 1 by bolts 2, which are secured to brackets or lugs 3 on the tank, so that the weight of the tank is directly supported by the car sill. The pipes $c$ and $d$ may then be connected with the main tank underneath the car.

I am thus enabled to provide cars with a much needed water-level indicator without disturbing the principal tank as previously installed and, in case of any derangement of the indicator mechanism, it can be readily disconnected and the auxiliary tank and mechanism may be removed without disturbing the principal tank, or a new auxiliary tank may be supplied in place of the one which is out of order.

I thus provide a device which has peculiar utility for railway service, because it may be so readily applied and removed without putting the car out of service and without disturbing the water system of the car.

I claim:

In a water level indicator for railway cars, the combination of an outer casing, with an inner casing, a lining of material non-conductive of heat interposed between the inner and outer casings, the inner casing being formed so as to constitute a chamber relatively narrow at one end and enlarged at the other end, a ball float in the enlarged end of the chamber, screw threaded plugs in opposite sides of the other end of the casing, a spindle, the ends of which are reduced in diameter and received by apertures in the screw threaded plugs, the portion of the spindle of greater diameter being arranged so as to abut against said plugs, indicating means connected with the spindle, and brackets whereby said casing may be suspended from the car sill.

EDWARD A. SCHREIBER.

Witnesses:
O. R. BARNETT,
J. H. RAYMOND.